(12) United States Patent
Miller

(10) Patent No.: US 7,827,006 B2
(45) Date of Patent: Nov. 2, 2010

(54) HEAT EXCHANGER FOULING DETECTION

(75) Inventor: John Philip Miller, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 591 days.

(21) Appl. No.: 11/669,696

(22) Filed: Jan. 31, 2007

(65) Prior Publication Data

US 2008/0183427 A1  Jul. 31, 2008

(51) Int. Cl.
*G06F 19/00* (2006.01)
(52) U.S. Cl. .................................................... 702/183
(58) Field of Classification Search ............... 702/130, 702/183, 182, 185, 188
See application file for complete search history.

(56) References Cited

U.S. PATENT DOCUMENTS

| | | | |
|---|---|---|---|
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,853,175 A | 8/1989 | Book, Sr. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Roger et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |
| 5,070,458 A | 12/1991 | Gilmore et al. |
| 5,121,467 A | 6/1992 | Skeirik |

(Continued)

FOREIGN PATENT DOCUMENTS

CA    2548211 A1    12/2006

(Continued)

OTHER PUBLICATIONS

International Search Report for Application No. PCT/US08/51107 dated Jul. 14, 2008.

(Continued)

*Primary Examiner*—Edward Raymond
(74) *Attorney, Agent, or Firm*—Marshall, Gerstein & Borun LLP

(57) ABSTRACT

Detection of one or more abnormal situations is performed using various statistical measures, such as a mean, a median, a standard deviation, etc. of one or more process parameters or variable measurements made by statistical process monitoring blocks within a plant. This detection may include determination of the health and performance of one or more heat exchangers in the plant, and in particular, detection of a fouling condition of the one or more heat exchangers. Among the statistical measures, the detection may include calculation of an overall thermal resistance of the heat exchanger, which may be indicative under certain circumstances of heat exchanger performance and in particularly degradation of heat exchanger performance as a result of heat exchanger fouling.

24 Claims, 7 Drawing Sheets

U.S. PATENT DOCUMENTS

| | | |
|---|---|---|
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Bonne |
| 5,189,232 A | 2/1993 | Shabtai et al. |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,311,562 A | 5/1994 | Palosamy et al. |
| 5,325,522 A | 6/1994 | Vaughn |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,461,570 A | 10/1995 | Wang et al. |
| 5,486,920 A | 1/1996 | Killpatrick et al. |
| 5,486,996 A | 1/1996 | Samad et al. |
| 5,488,697 A | 1/1996 | Kaemmerer et al. |
| 5,499,188 A | 3/1996 | Kline, Jr. et al. |
| 5,519,647 A | 5/1996 | DeVille |
| 5,521,842 A | 5/1996 | Yamoda |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,552,984 A | 9/1996 | Crandall et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,719,767 A | 2/1998 | Jang |
| 5,729,661 A | 3/1998 | Keeler et al. |
| 5,740,324 A | 4/1998 | Mathur et al. |
| 5,742,513 A | 4/1998 | Bouhenguel et al. |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,817,958 A | 10/1998 | Uchida et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,964 A | 1/1999 | Wang et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 6,008,985 A | 12/1999 | Lake et al. |
| 6,014,598 A | 1/2000 | Duyar et al. |
| 6,017,143 A | 1/2000 | Eryurek et al. |
| 6,026,352 A | 2/2000 | Burns et al. |
| 6,033,257 A | 3/2000 | Lake et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Haviena et al. |
| 6,108,616 A | 8/2000 | Borchers et al. |
| 6,110,214 A | 8/2000 | Kiimasauskas |
| 6,119,047 A | 9/2000 | Eryurek et al. |
| 6,122,555 A | 9/2000 | Lu |
| 6,128,279 A | 10/2000 | O'Neil et al. |
| 6,144,952 A | 11/2000 | Keeler et al. |
| 6,169,980 B1 | 1/2001 | Keeler et al. |
| 6,246,950 B1 | 6/2001 | Bessler et al. |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,701 B1 | 11/2001 | Pyotsia et al. |
| 6,332,110 B1 | 12/2001 | Wolfe |
| 6,397,114 B1 | 5/2002 | Eryurek |
| 6,421,571 B1 | 7/2002 | Spriggs et al. |
| 6,445,963 B1 | 9/2002 | Blevins et al. |
| 6,532,392 B1 | 3/2003 | Eryurek et al. |
| 6,539,267 B1 | 3/2003 | Eryurek et al. |
| 6,594,589 B1 | 7/2003 | Coss, Jr. et al. |
| 6,609,036 B1 | 8/2003 | Bickford |
| 6,615,090 B1 | 9/2003 | Blevins et al. |
| 6,633,782 B1 | 10/2003 | Schleiss et al. |
| 6,901,300 B2 | 5/2005 | Blevins et al. |
| 7,085,610 B2 | 8/2006 | Eryurek et al. |
| 7,233,834 B2 | 6/2007 | McDonald, Jr. et al. |
| 7,383,790 B2 | 6/2008 | Francino et al. |
| 2002/0022894 A1 | 2/2002 | Eryurek et al. |
| 2002/0038156 A1 | 3/2002 | Eryurek et al. |
| 2002/0077711 A1 | 6/2002 | Nixon et al. |
| 2002/0107858 A1 | 8/2002 | Lundahl et al. |
| 2002/0123864 A1 | 9/2002 | Eryurek et al. |

| | | | |
|---|---|---|---|
| 2002/0133320 A1 | 9/2002 | Wegerich et al. | |
| 2002/0147511 A1 | 10/2002 | Eryurek et al. | |
| 2002/0161940 A1 | 10/2002 | Eryurek et al. | |
| 2002/0163427 A1 | 11/2002 | Eryurek et al. | |
| 2003/0014500 A1 | 1/2003 | Schleiss et al. | |
| 2003/0074159 A1 | 4/2003 | Bechhoefer et al. | |
| 2004/0064465 A1 | 4/2004 | Yadav et al. | |
| 2004/0078171 A1 | 4/2004 | Wegerich et al. | |
| 2005/0060103 A1 | 3/2005 | Chamness | |
| 2005/0133211 A1* | 6/2005 | Osborn et al. | 165/157 |
| 2005/0143873 A1 | 6/2005 | Wilson | |
| 2005/0197792 A1 | 9/2005 | Haeuptle | |
| 2005/0210337 A1 | 9/2005 | Chester et al. | |
| 2005/0256601 A1 | 11/2005 | Lee et al. | |
| 2005/0267710 A1 | 12/2005 | Heavner, III et al. | |
| 2006/0020420 A1 | 1/2006 | Vesel | |
| 2006/0020423 A1 | 1/2006 | Sharpe, Jr. | |
| 2006/0052991 A1 | 3/2006 | Pflugl et al. | |
| 2006/0067388 A1 | 3/2006 | Sedarat | |
| 2006/0074598 A1 | 4/2006 | Emigholz et al. | |
| 2006/0085689 A1 | 4/2006 | Bjorsne | |
| 2006/0157029 A1 | 7/2006 | Suzuki et al. | |
| 2006/0265625 A1 | 11/2006 | Dubois et al. | |
| 2007/0005298 A1 | 1/2007 | Allen et al. | |
| 2007/0097873 A1 | 5/2007 | Ma et al. | |
| 2007/0109301 A1 | 5/2007 | Smith | |
| 2008/0027678 A1 | 1/2008 | Miller | |
| 2008/0097637 A1 | 4/2008 | Nguyen et al. | |
| 2008/0208527 A1 | 8/2008 | Kavaklioglu | |

FOREIGN PATENT DOCUMENTS

| | | |
|---|---|---|
| EP | 0 612 039 A2 | 8/1994 |
| EP | 0 626 697 A1 | 11/1994 |
| EP | 0 961 184 A2 | 12/1999 |
| EP | 0 964 325 A1 | 12/1999 |
| EP | 0 965 897 A1 | 12/1999 |
| GB | 2 294 129 A | 4/1996 |
| GB | 2 294 793 A | 5/1996 |
| GB | 2 347 234 A | 8/2000 |
| GB | 2 360 357 A | 9/2001 |
| JP | 07-152714 | 6/1995 |
| WO | WO 01/79948 A1 | 10/2001 |
| WO | WO 2006/026340 | 3/2006 |
| WO | WO 2006/107933 | 10/2006 |

OTHER PUBLICATIONS

International Preliminary Report on Patentability for Application No. PCT/US2008/051107, dated Aug. 4, 2009.
Supplementary European Search Report for European Application No. EP 08727702, dated Dec. 28, 2009.
" Predictor™ Services," GE Industrial Systems, available at http://www.geindustrial.com/cwc/services?id=74 on Jul. 18, 2002.
"Customer Benefits," GE Industrial Systems, available at http://www.geindustrial.com/cwc/services?id=75 on Jul. 18, 2002.
"Customer Impact," GE Industrial Systems, available at http://www.geindustrial.com/cwc/services?id=73 on Jul. 18, 2002.
"Electrical Equipment Coverage," GE Industrial Systems, available at http://www.geindustrial.com/cwc/services?id=72 on Jul. 18, 2002.
"Ge Predictortm Services: Services Information," GE Industrial Systems, available at http://www.geindustrial.com/cwc/services?id=71 on Jul. 18, 2002.
"Root Cause Diagnostics: Software for Diagnosing Problems in Typical Industrial Loops," Kavaklioglu et al., presented at Maintenance adn Reliability Conference (MARCON 2002), Knoxville, TN, May 2002.

"Root Cause Diagnostics™ SNAP-ON™ Application," Emerson Process Management, availabe at http://www.documenation.emersonprocess.com/gaps/public/documents/data sheets/allds04ole ROOTCx.pdf., Dec. 2003.
U.S. Appl. No. 11/492,577, "Method and System for Detecting Abnormal Operation of a Level Regulatory Control Loop," John P. Miller filed on Jul. 25, 2006.
Ashish Mehta, et al., "Feedforward Neural Networks for Process Identification and Prediction," presented at ISA 2001, Houston, Texas, Sep. 2001.
Chiang et al., "Fault Detection and Diagnosis in Industrial Systems," pp. 70-83,Springer-Verlag London Berlin Heidelberg (2001).
Tzovla et al., "Abnormal Condition Management Using Expert Systems," presented at ISA 2001, Houston, Texas, Sep. 2001.
Wernwe Kalkhoff, "Agent-Oriented Robot Task Transformation", Proceedings of the International Symposium on Intelligent Control, IEEE, pp. 242-247 (Aug. 27, 1995).
Du et al., "Automated Monitoring of Manufacturing Processes, Part 1: Monitoring Methods," *J. Engineering for Industry*, 117:121-132 (1995).
Hines et al., "Sensor Validation and Instrument Calibration Monitoring," University of Tennesse Maintenance and Reliability Center (2001).
Horch, "Oscillation Diagnosis in Control Loops—Stiction and Other Causes," Proceedings of the 2006 American Control Conference, Minneapolis, Minnesota, pp. 2086-2096 (2006).
International Preliminary Report on Patentability for Application No. PCT/US2007/074259, dated Jan. 27, 2009.
International Preliminary Report on Patentability for Application No. PCT/US2007/074355, dated Jan. 27, 2009.
International Preliminary Report on Patentability for Application No. PCT/US2007/074363, dated Feb. 5, 2009.
International Search Report and Written Opinion for International Application No. PCT/US2007/074363, dated Dec. 20, 2007.
International Search Report for International Application No. PCT/US2007/074259, dated Dec. 7, 2007.
International Search Report for International Application No. PCT/US2007/074355, dated Dec. 20, 2007.
Montgomery, "Control Charts as a Tool in SQC (Statistical Quality Control)" Control Charts as a Tool in SQC, available at <http://deming.eng.clemson.edu/pub/tutorials/qctools/ccmainl.htm> on May 30, 2006.
Non-Final Office Action mailed Apr. 27, 2009 (U.S. Appl. No. 11/492,460).
Non-Final Office Action mailed Feb. 3, 2009 (U.S. Appl. No. 11/492,347).
Pettersson, "Execution Monitoring in Robotics: A Survey," *Robotics and Autonomous Systems*, 53:73-88 (2005).
Romeu, "Understanding Binomial Sequential Testing," START: Selected Topics in Assurance Related Technologies, 12(2):1-8 (2005).
Ruel, "Diagnose Loop Behavior to Find and Correct Problems with Final Control Elements, the Environment, and Upstream Systems Before You Tune the Controller," Loop Optimization, available at <http://www.expertune.com/artConApr99.html> on Jun. 1, 2006.
Schwarz et al., "Spectral Envelope Estimation and Representation for Sound Analysis-Synthesis," Spectral Envelope Estimation and Representation, available at http://recherche.ircam.fr/equipes/analyse-synthese/schwarz/publications/icmc1999/se99-poster.html> on May 31, 2006.
Wald, "Sequential Tests of Statistical Hypotheses," Ann. Math. Statist., 16(2):117-186 (1945).
International Preliminary Report on Patentability for Application No. PCT/US2006/029986, dated Apr. 1, 2008.
"Heat Exchangers," Washington Universtiy in St. Louis, available at http://www.me.wustl.edu/ME/labs/thermal/me372b5.htm on Jun. 13, 2006 (7 pages).

* cited by examiner

FIG. 6

Table 1 - RCD Fault Table Including Heat Exchanger Fouling

| Fault | T(h,in) | T(h,out) | T(c,in) | T(c,out) | Flow(h) | SP(h) | CD(h) | VP(h) | Flow(c) | SP(c) | CD(c) | VP(c) | DP(h) | 1/UA |
|---|---|---|---|---|---|---|---|---|---|---|---|---|---|---|
| Cold Fluid Valve Stuck | | | | | | | | | | | | | | |
| Hot Fluid Valve Stuck | | | | | | | U or D | | | | | | | |
| Cold Fluid Flow Measurement Drift (increase) | | | | | | | | | U | U | | | | |
| Cold Fluid Flow Measurement Drift (decrease) | | | | | | | | | D | D | | | | |
| Hot Fluid Flow Measurement Drift (increase) | | | | U | | | D | D | D | D | D | D | D | |
| Hot Fluid Flow Measurement Drift (decrease) | | | | D | | | U | U | U | U | U | U | U | |
| Hot Fluid Temp Out Measurement Drift (increase) | | | | D | | | | | | U | U | U | | |
| Hot Fluid Temp Out Measurement Drift (decrease) | | | | U | | | | | | D | D | D | | |
| Hot Fluid Temp In Measurement Drift (increase) | U | | | | | | | | | | | | | |
| Hot Fluid Temp In Measurement Drift (decrease) | D | | | | | | | | | | | | | |
| Cold Fluid Temp In Measurement Drift (increase) | | | U | | | | | | | | | | | |
| Cold Fluid Temp In Measurement Drift (decrease) | | | D | | | | | | | | | | | |
| Cold Fluid Temp Out Measurement Drift (increase) | | | | U | | | | | | | | | | |
| Cold Fluid Temp Out Measurement Drift (decrease) | | | | D | | | | | | | | | | |
| Cold Fluid Liquid Leak | | | | | | | | | U | U | U | U | | |
| Hot Fluid Liquid Leak | | | | | | | | | D | D | D | D | D | |
| Heat Exchanger Fouling | | | | D | | | U | U | U | U | U | U | U | U |

HEAT EXCHANGER FOULING DETECTION

FIELD OF THE DISCLOSURE

This patent relates generally to performing diagnostics and maintenance in a process plant and, more particularly, to providing diagnostic capabilities within a process plant in a manner that can evaluate and predict the health and performance of a heat exchanger.

BACKGROUND

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken, malfunctioning or underperforming devices, plugged fluid lines or pipes, logic elements, such as software routines, being improperly configured or being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or a wireless bus, an Ethernet, a modem, a phone line, and the like, have processors and memories that are adapted to run software or firmware, such as the DeltaV™ and Ovation control systems, sold by Emerson Process Management, wherein the software includes numerous control module and control loop diagnostic tools. Likewise, maintenance workstations, which may be connected to the process control devices, such as field devices, via the same communication connections as the controller applications or via different communication connections, such as OPC connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications nave been developed to diagnose problems within the supporting equipment within the process plant.

Thus, for example, the AMS Suite: Intelligent Device Manager application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, Machinery Health™ applications provided by CSI, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+) within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time before which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plan if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

One technique collects data that enables a user to predict the occurrence of certain abnormal situations within a process plant before these abnormal situations actually arise or shortly after they arise, with the purpose of taking steps to prevent the predicted abnormal situation or to correct the abnormal situation before any significant loss within the process plant takes place. This procedure is disclosed in U.S. patent application Ser. No. 09/972,078, now U.S. Pat. No. 7,085,610, entitled "Root Cause Diagnostics" (based in part on U.S. patent application Ser. No. 08/623,569, now U.S. Pat. No. 6,017,143). The entire disclosures of both of these applications/patents are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then be sent to a user interface or other processing device and analyzed to recognize patterns suggesting the actual or future occurrence of a known abnormal situation. Once a particular suspected abnormal situation is detected, steps may be taken to correct the underlying problem, thereby avoiding the abnormal situation in the first place or correcting the abnormal situation quickly. However, the collection and analysis of this data may be time consuming and tedious for a typical maintenance operator, especially in process plants having a large number of field devices collecting this statistical data. Still further, while a maintenance person may be able to collect the statistical data, this person may not know how to best analyze or view the data or to determine what, if any, future abnormal situation may be suggested by the data.

Another technique to detect and predict one or more abnormal situations is performed using various statistical measures, such as a mean, median, standard deviation. etc. of process parameters or variable measurements determined by statistical process monitoring (SPM) blocks within a plant. This detection is enhanced in various cases by the use of specialized data filters and data processing techniques, which are designed to be computationally simple and therefore are able to be applied to data collected at a high sampling rate in a field device having limited processing power. The enhanced data or measurements may be used to provide better or more accurate statistical measures of the process variable or process parameter, may be used to trim the data to remove outliers from this data, may be used to fit this data to non-linear functions, or may be use to quickly detect the occurrence of various abnormal situations within specific plant equipment, such as distillation columns and refinery catalytic crackers. While the statistical data collection and processing and abnormal situation detection may be performed within a user interface device or other maintenance device within a process plant, these methods may also and advantageously be used in the devices, such as field devices like valves, transmitters, etc.

which collect the data in the first place, thereby removing the processing burden from the centralized user interface device as well as the communication overhead associated with sending the statistical data from the field devices to the user interface device. Abnormal situation detection and prediction utilizing the foregoing techniques are disclosed and described in U.S. Patent Application Ser. Nos. 60/668,243 entitled "Process Diagnostics," which was filed on Apr. 4, 2005 and 10/589,728 entitled "Statistical Processing Methods Used in Abnormal Situation Detection," which was filed Aug. 17, 2006, the disclosures of which are hereby expressly incorporated by reference in their entirety for all purposes.

Statistical methods can reveal problems within process plants as the problems arise and before such problems lead to the process operating in an abnormal or suboptimal state for an extended period or before damage is caused to the processing plant. Still, particular problems may prove more difficult to detect through statistical methodologies. For example, where the available measured parameters correlate to one or more problems or faults, it may not be possible to isolate the particular fault. Additional correlations must be sought to distinguish the faults from the available data. Such a situation exists with temperature to flow cascade loops containing a heat exchanger, which is a very common chemical and petroleum industry application. It is desirable to detect heat exchanger fouling in this loop, which can lead to suboptimal performance. However, the measurement changes indicative of heat exchanger fouling may be the same as those for measurement drift in the process fluid flow rate, thus making detection difficult or impractical using statistical methods.

BRIEF DESCRIPTION OF THE DRAWINGS

FIG. 6 is a table indicating root cause diagnostic parameters that may be selected to determine heat exchanger fouling.

DETAILED DESCRIPTION

Figure 1:
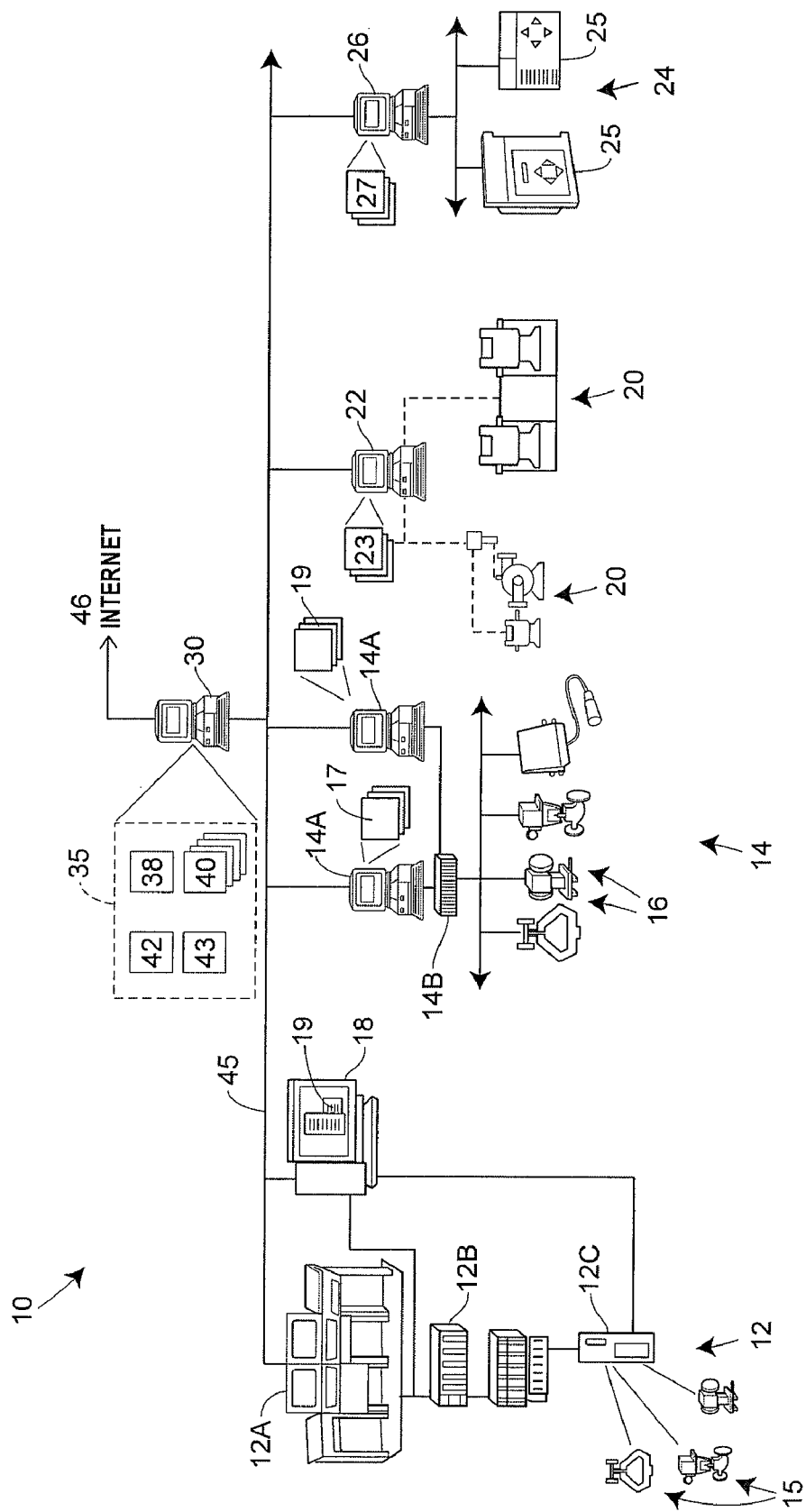
FIG. 1 is an exemplary block diagram of a process plant having a distributed control and maintenance network including one or more operator and maintenance workstations, controllers, field devices and supporting equipment.

FIG. 1 illustrates an example process plant 10 that may be configured with an abnormal situation prevention system. In one possible configuration the abnormal situation prevention system may be configured to recognize heat exchanger fouling as distinguished from other possible process conditions including process fluid drift. The process plant may include a number of control and maintenance systems interconnected together with supporting equipment via one or more communication networks. The process plant 10 illustrated by FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART) field devices 15. The process control system 14 may be a distributed process control system and include one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as poor example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks 12C (including wireless or handheld device networks) to communicate with and, in some instances, to reconfigure or to perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 may also include various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or other any other known applications used to diagnose, monitor and optimize the operating state of the rotating equipment 20. Maintenance personnel usually use the applications 23 to maintain and oversee the performance of rotating equipment 20 in the plant 10 to determine problems with the rotating equipment 20 and to determine when and it the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration and data collection application 38, a viewing or interface application 40, which may include statistical collection and processing blocks, and a rules engine development and execution application 42 and, additionally, stores a statistical process monitoring database 43 that stores statistical data generated within certain devices within the process, such as statistical measures of various process parameters. Generally speaking, the configuration and data collection application 38 configures and communicates with each of a number of statistical data collection and analysis blocks (not shown in FIG. 1) located in the field devices 15, 16, the controllers 12B, 14B, the rotating equipment 20 or its supporting computer 2, the power generation equipment 25 or its supporting computer 26 and any other desired devices and equipment within the process plant 10, to thereby collect statistical data (or in some cases, actual raw process variable data) from each of these blocks with which to perform abnormal situation detection. The configuration and data collection application 38 may be communicatively connected via a hardwired bus 45 to each of the computers or devices within the plant 10 or, alternatively, may be connected via any other desired communication connection including, for example, wireless connections, dedicated connections which use OPC, intermittent connections, such as ones which rely on hand-held devices to collect data, etc.

Likewise, the application 38 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the application 38 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the application 38 to computers/devices in the plant 10 are described herein, one of ordinary skill in the art will recognize that a variety of other methods of coupling the application 38 to computers/devices in the plant 10 can be used as well. The application 38 may generally store the collected data in the database 43.

Once the statistical data (or process variable data) is collected, the viewing application 40 may be used to process this data and/or to display the collected or processed statistical data (e.g., as stored in the database 43) in different manners to enable a user, such as a maintenance person, to better be able to determine the existence of or the predicted future existence of an abnormal situation and to take preemptive or actual corrective actions. The rules engine development and execution application 42 may use one or more rules stored therein to analyze the collected data to determine the existence of, or to predict the future existence of an abnormal situation within the process plant 10. Additionally, the rules engine development and execution application 42 may enable an operator or other user to create additional rules to be implemented by a rules engine to detect or predict abnormal situations. It is appreciated that the detection of an abnormal situation as described herein encompasses the prediction of a future occurrence of an abnormal situation.

Figure 2:
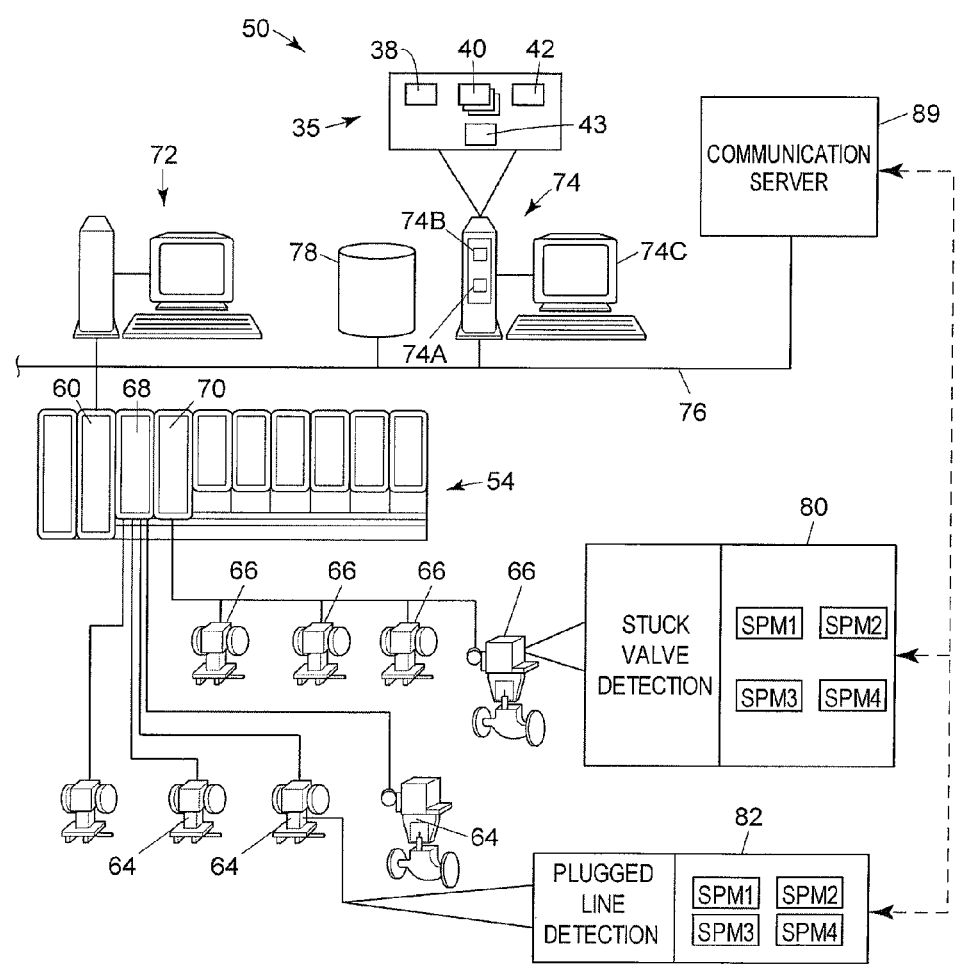
FIG. 2 is an exemplary block diagram of a portion of the process plant of FIG. 1, illustrating communication interconnections between various components of an abnormal situation prevention system located within different elements of the process plant, including the use of statistical process monitoring (SPM) blocks.

FIG. 2 illustrates a portion 50 of the example process plant 10 of FIG. 1 for the purpose of describing one manner in which statistical data collection and processing and in some cases abnormal situation detection may be performed by components associated with the abnormal situation prevention system 35 including blocks located within field devices. While FIG. 2 illustrates communications between the abnormal situation prevention system applications 38, 40 and 42 and the database 43 and one or more data collection and processing blocks within HART and Fieldbus field devices, it will be understood that similar communications can occur between the abnormal situation prevention system applications 38, 40 and 42 and other devices and equipment within the process plant 10, including any of the devices and equipment illustrated in FIG. 1. The portion 50 of the process plant 10 illustrated in FIG. 2 includes a distributed process control system 54 having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART field devices and the field devices 66 are illustrated as Fieldbus field devices, although these field devices could use any other desired communication protocols. Additionally, the field devices 64 and 66 may be any types of devices such as, for example, sensors, valves, transmitters, positioners, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the database 78 may store historical abnormal situation prevention data, including statistical data collected and/or generated by the field devices 64 and 66 within the process plant 10 or statistical data determined from process variables collected by the field devices 64 and 66.

While the process controllers 60, I/O devices 68 and 70, and field devices 64 and 66 are typically located down within and distributed throughout the sometimes harsh plant environment, the workstations 72 and 74, and the database 78 are usually located in control maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention applications 38, 40 and 42 discussed with respect to FIG. 1 in a manner that these applications can be implemented on the processor 74A to provide information to a user via the display 74C (or any other display device, such as a printer).

Additionally, as shown in FIG. 2, some (and potentially all) of the field devices 64 and 66 include data collection and processing blocks 80 and 82. While, the blocks 80 and 82 are described with respect to FIG. 2 as being advanced diagnostics blocks (ADBs), which are known FOUNDATION fieldbus function blocks that can be added to Fieldbus devices to collect and process statistical data within Fieldbus devices, for the purpose of this discussion, the blocks 80 and 82 could be or could include any other type of block or module located within a process device that collects device data and calculates or determines one or more statistical measures or parameters for that data, whether or not these blocks are located in Fieldbus devices or conform to the Fieldbus protocol. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70, in an intermediate device that is located within the plant and that communicates with multiple sensors or transmitters and with the controller 60, or any of the devices illustrated in FIG. 1. Additionally, the blocks 80 and 82 could be in any subset of the devices 64 and 66.

Generally speaking, the blocks 80 and 82 or sub-elements of these blocks, collect data, such a process variable data, within the device in which they are located and perform statistical processing or analysis on the data for any number of reasons. For example, the block 80, which is illustrated as being associated with a valve, may analyze the valve process variable data to determine if the operating condition of the valve itself, e.g., if the valve is in a stuck condition. In addition, the block 80 includes a set of four statistical process monitoring (SPM) blocks or units SPM1-SPM4 which may collect process variable or other data within the valve, whether related directly to the performance of the valve or to other processes, and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. Neither the specific statistical data generated, nor the method in which it is generated is critical. Thus, different types of statistical data can be generated in addition to, or instead of, the specific types described above and for any purpose. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively and qualitatively more accurate process variable data. As a result, the SPM blocks are generally capable of determining better statistical calculations with respect to the collected process variable data than a block located outside of the device in which the process variable data is collected.

As another example, the block 82 of FIG. 2, which is illustrated as being associated with a transmitter analyzes the process variable data collected by the transmitter and its operating condition, e.g., determining if a line within the plant is plugged. In addition, the block 82 includes a set of four SPM blocks or units SPM1-SPM4 which may collect process variable or other data within the transmitter and perform one or more statistical calculations on the collected data to determine, for example, a mean, a median, a standard deviation, etc. of the collected data. If desired, the underlying operation of the blocks 80 and 82 may be performed or implemented as described in U.S. Pat. No. 6,017,143 referred to above. While the blocks 80 and 82 are illustrated as including four SPM blocks each, the blocks 80 and 82 could have any other number of SPM blocks therein for collecting data and determining statistical measures associated with that data. Likewise, while the blocks 80 and 82 are illustrated as including detection software for detecting particular conditions within the plant 10, they need not have such detection software or could include detection software for detecting other conditions within the plant as described below. Still further, while the SPM blocks discussed herein are illustrated as being sub-elements of ADBs, they may instead be stand-alone blocks located within a device. Also, while the SPM blocks discussed herein may be known FOUNDATION fieldbus SPM blocks, the term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software or firmware or other elements that perform this function, whether these elements are in the form of function blocks, or other types of blocks, programs, routines or elements and whether or not these elements conform to the FOUNDATION fieldbus protocol, or some other protocol, such as PROFIBUS, WORLDFIP, Device-Net, AS-Interface, HART, CAN, etc. protocols.

Figure 3:
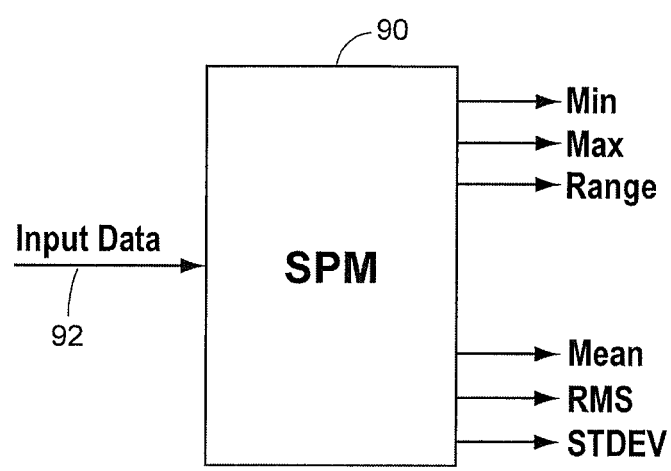
FIG. 3 is a block diagram of an example SPM block.

FIG. 3 illustrates a block diagram of an SPM block 90 (which could be any of the SPM blocks in the blocks 80 and 82 of FIG. 2 or any other device) which accepts raw data on an input 92 and operates to calculate various statistical measures of that data, including a Mean, an RMS value, and one or more standard deviations. For a given set of raw input data, the block 90 may also determine a minimum value (Min), a maximum value (Max) and a range. If desired, this block may calculate specific points within the data, such as the Q25, Q50 and Q75 points and may perform outlier removal based on the distributions. Of course this statistical processing can be performed using any desired or known processing techniques.

While certain statistical monitoring blocks are illustrated in FIG. 2, it will be understood that other parameters could be monitored as well or in addition. For example, the SPM blocks, or the ADBs discussed with respect to FIG. 2 may calculate statistical parameters associated with a process and may trigger certain alerts, based on changes in these values. By way of example, Fieldbus type SPM blocks may monitor a process and provide a number of different data associated with monitored process variables or configuration parameters. These data may include Block Tag, Block Type. Mean, Standard Deviation, Mean Change, Standard Deviation Change, Baseline Mean, Baseline Standard Deviation, High Variation Limit, Low Dynamics Limit, Mean Limit, Status, Parameter Index, Time Stamp and User Command. The two most commonly used parameters are the Mean and Standard Deviation. However, other SPM parameters that are often useful are Baseline Mean, Baseline Standard Deviation, Mean Change. Standard Deviation Change and Status. Of course, the SPM blocks could determine any other desired statistical measures or parameters and could provide other parameters associated with a particular block to a user or requesting application. Thus, SPM blocks are not limited to the ones discussed herein.

As is also understood, the parameters of the SPM blocks (SPM1-SPM4) within the field devices may be made available to an external client such as the workstation 74, or any other external device for example that is adapted to run the application 38, through the bus or communication network 76 and the controller 60. Additionally or in the alternative, the parameters and other information gathered by or generated by the SPM blocks (SPM1-SPM4) within the ADBs 80 and 8' may be made available to the external workstation, such as the workstation 74, through, for example, a suitable server, for example. OPC server 89. This connection may be a wireless connection, a hardwired connection, an intermittent connection (such as one that uses one or more handheld devices) or any other desired communication connection using any desired or appropriate communication protocol. Of course, any of the communication connections described herein may use an OPC communication server to integrate data received from different types of devices in a common or consistent format.

Still further, it is possible to place SPM blocks in host devices, devices other than field devices, or other field devices to perform statistical process monitoring outside of the device that collects or generates the raw data, such as the raw process variable data. Thus, for process variable data via, for example, the OPC server 89 and which calculate some statistical measure or parameter, such as a mean, a standard deviation, etc. for that process variable data. While these SPM blocks are not located in the device which collects the data and, therefore, are generally not able to collect as much process variable data to perform the statistical calculations due to the communication requirements for this data, these blocks are helpful in determining statistical parameters for devices or process variable within devices that do not have or support SPM functionality. Additionally, available throughput of networks may increase over time as technology improves, and SPM blocks not located in the device which collects the raw data may be able to collect more process variable data to perform the statistical calculations. Thus, it will be understood in the discussion below, that any statistical measurements or parameters described to be generated by SPM blocks, may be generated by SPM blocks such as the SPM1-SPM4 blocks in the ADBs 80 and 82, or in SPM blocks within a host or other devices including other field devices. Moreover, abnormal situation detection and other data processing may be performed using the statistical measures in the field devices or other devices in which the SPM blocks are located, and thus detection based on the statistical measures produced by the SPM blocks is not limited to detection performed in host devices, such as user interfaces.

Importantly, the maximum beneficial use of the data and the calculation of various statistical measures based on this data as described above is dependent in large part on the accuracy of the data in the first place. A number of data processing functions or methods may be applied in the SPM blocks or otherwise to increase the accuracy or usefulness of the data and/or to preprocess the data and develop more accurate or better statistical data. Thus, various data processing techniques may be employed such as trimming and filtering. Trimming is useful in detecting and then eliminating spikes, outliers and bad data points so that these data points do not skew statistical parameters. Trimming could be performed based on sorting and removing certain top and bottom percentages of the data, as well as using thresholds based on the standard deviation or some weighted moving average. Trimmed points may be removed from the data sequence, or an interpolation may be performed to replace outlier data with an estimate of what that data should be based on other data collected prior to and/or after that data. Filters may be implemented using any known or available digital signal processing techniques and may be specified or defined using any known filter parameters, for example, the desired slope of the filter, the pass and rejection frequencies of the filter, etc. Another important aspect of making accurate and useful statistical determinations in SPM blocks (and elsewhere) involves selecting an appropriate data block or time length over which to calculate the statistical measures, such as the mean, the standard deviation, etc. The sample may be determined using pure statistical guidelines to select the number of points. Alternatively, block length calculation techniques may be used. Such techniques may contemplate the frequency components (e.g., frequency domain) of the signal based on collected test points and the dominant system time constant as determined from the frequency components to set the block length as some multiple (which may be an integer or a non-integer multiple) of the dominant system time constant.

One advantageous manner of using an SPM block and the herein described techniques relates to the monitoring of a heat exchanger and performing diagnostics using statistical process monitoring for the heat exchanger. In particular, various diagnostics methodologies based on process fluid inlet and outlet temperatures, control fluid inlet and outlet temperatures and device operating states and/or parameters can be used to determine the health and performance of the heat exchanger and particularly the presence of heat exchanger fouling. As described above, the methodologies described here could be implemented either in the field devices within the plant or at a host system as software. The main advantage of these methods is the use of statistical process parameters, which may be evaluated by field instruments, to provide high quality measurements and fast estimates.

Figure 4:
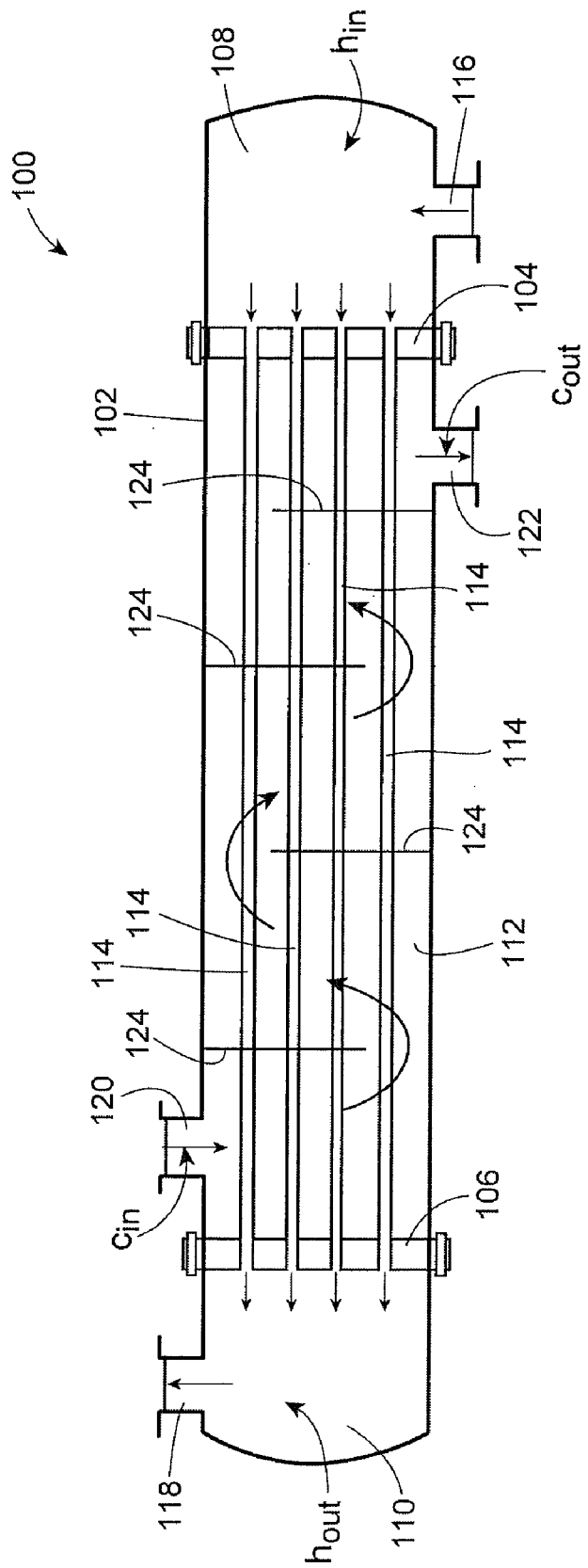
FIG. 4 is a schematic diagram of a typical heat exchanger that may be used in a process plant.

FIG. 4 illustrates a schematic of a typical heat exchanger 100 found in many processing plants. As can be see from FIG. 4, the heat exchanger has an outer shell 102. A first partition 104 and a second partition 106 divide an interior of the shell 102 into an inlet plenum 108, an outlet plenum 110 and a shell chamber 112. A plurality of tubes 114 connect the inlet plenum 108 with the outlet plenum 110 and hence an inlet tube 116 with an outlet tube 118. A shell inlet 120 and a shell outlet 122 couple to the chamber 112, the shell inlet 120 being disposed adjacent the partition 106 and the shell outlet 122 being, disposed adjacent the partition 104. An optional plurality of baffles 124 define a circuitous path with the chamber from the shell inlet 120 to the shell outlet 122. As depicted in FIG. 4, a "process" or "hot" fluid may enter the heat exchanger 100 via the inlet tube 116 and the inlet plenum 108. The hot fluid is transferred via the tubes 114 from the inlet plenum 108 to the outlet plenum 110, and the hot fluid exits the heat exchanger from the outlet plenum via the outlet tube 118. This hot fluid flow is depicted by the arrows $h_{in}$ and $h_{out}$. A "control" or "cold" fluid enters the chamber 112 via the shell inlet 120, is transferred around the tubes 114 and along the circuitous path defined by the baffles 124 and exits the chamber 112 via the shell outlet 122. The cold fluid flow is depicted by the arrows $c_{in}$ and $c_{out}$. As used herein, the terms process or hot fluid is used to refer to the fluid the temperature of which is being controlled, e.g., a first fluid, by the flow of a control or cold fluid, e.g., a second fluid, through the heat exchanger. The terms are used generally and interchangeably with the understanding that the temperature of one fluid flowing through the heat exchanger is being controlled by the controlled flow of another fluid through the heat exchanger. It should be further understood that the herein described invention has application to simple heat exchangers where hot fluid and cold fluid terminology is more readily applied or temperature-to-flow cascade loop arrangements where process fluid and control fluid terminology may be better understood.

The hot fluid has a hot fluid inlet temperature T(h,in), a hot fluid outlet temperature T(h,out) and a hot fluid flow rate Flow(h). Similarly, the cold fluid has a cold fluid inlet temperature T(c,in), a cold fluid outlet temperature T(c,out) and a cold fluid flow rate Flow(c).

The heat exchanger 100, a shell-and-tube heat exchanger with one shell pass and one tube pass and cross-counter flow operation is merely illustrative. It is used to facilitate an understanding of the herein described methodology for the prediction and diagnosis of heat exchanger performance. The particular heat exchanger structure whether single or multiple pass cross or parallel flow, tube and shell, etc. is not material to the workings of the herein described methodology, and the methodology may be used to monitor the health and performance of virtually any heat exchanger structure.

Not depicted in FIG. 4 are field devices or other sensors or instrumentation operable to provide data relating to the hot fluid and the cold fluid. Suitable devices, such as transmitter devices, such as those available from Rosemount, or valves controlling the respective flow rates and in particular the cold fluid flow rate, may be suitably coupled to each inlet and outlet. Alternative devices and instrumentation may be used, and any suitable device or devices may be used to obtain the data relating to the hot fluid at the inlet and the outlet and the cold fluid at the inlet and the outlet. Furthermore, the devices and/or instrumentation may provide for preliminary data screening (sampling, trimming and filtering) and the data may consist of statistical data, e.g. mean and standard deviation, determination of an operating characteristic of the heat exchanger, and for example, the thermal resistance of the heat exchanger. The thermal resistance is determinable by the energy balance equation:

$$\dot{Q} = UA \Delta T_{LMTD} = \dot{m}_h C_h \Delta T_h = \dot{m}_c C_c \Delta T \quad (1)$$

Where $\dot{Q}$ is the heat transfer rate, A is the surface area of heat transfer, U is the average heat transfer coefficient per unit surface area and $\Delta T_{LMTD}$ is the logarithmic mean temperature difference for the heat exchanger. $\Delta T_{LMTD}$ may be defined as:

$$\Delta T_{LMTD} = \frac{\Delta t_1 - \Delta t_2}{ln(\Delta t_1 / \Delta t_2)} \quad (2)$$

For the counter-flow heat exchanger 100 $\Delta t_1$ and $\Delta t_2$ can be related to the hot and cold fluid inlet and outlet temperatures, under the assumption the hot fluid is being cooled, as follows:

$$\Delta t_1 = t_{h,in} - t_{c,in}; \Delta t_2 = t_{h,out} - t_{c,out} \quad (3)$$

For a parallel flow heat exchanger $\Delta t_1$ and $\Delta t_2$ can be related to the hot and cold fluid inlet and outlet temperatures, under the assumption the hot fluid is being cooled, as follows:

$$\Delta t_1 = t_{h,in} - t_{c,out}; \Delta t_2 = t_{h,out} - t_{c,in} \quad (4)$$

A is defined for the heat exchanger; however, U is very difficult to determine analytically. However, the product UA can be calculated based upon other measurements. From equation (1):

$$\frac{1}{UA} = \frac{\Delta T_{LMTD}}{\dot{m}_h C_h \Delta T_h} = \frac{\Delta T_{LMTD}}{\dot{m}_c C_c \Delta T_c} \quad (5)$$

The term 1/UA is known as the overall thermal resistance. The overall thermal resistance can be calculated based upon measurements normally available in a heat exchanger control loop. Specifically, a set of measurements that may be used to calculate overall thermal resistance include the inlet and outlet temperatures of both the hot fluid and the cold fluid and the hot fluid flow rate and the cold fluid flow rate. Other measurements that may be correlated to the overall thermal resistance may also or alternatively be used.

Figure 5:
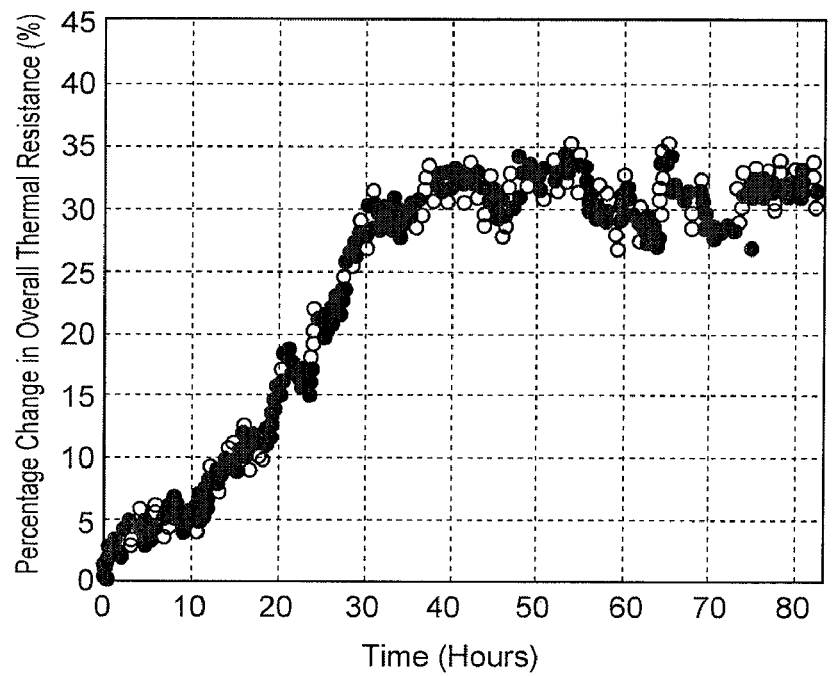
FIG. 5 graph illustrating overall heat exchanger thermal resistance with time in the presence of fouling.

Statistics based upon the thermal resistance of the heat exchanger may be viewed and evaluated to determine heat exchanger health and to predict heat exchanger fouling. FIG. 5 illustrates the percent change in the overall thermal resistance of a heat exchanger in time, of a predetermined threshold, e.g., 25%, may indicate heat exchanger fouling. The rate of change of thermal resistance, e.g., the slope of the plot, may predict when a heat exchanger may become fouled to a level adversely impacting plant performance.

The herein described methodology may be implemented as part of a broader root cause diagnostics (RCD) rule base. In such a case, numerous process data and parameters are available for evaluation, several of which are indicated in the table shown in FIG. 6. The table illustrates a number of fault conditions 140 and a number of process parameters 142. Included among the process parameters 142 are the hot fluid inlet temperature T(h,in), the hot fluid outlet temperature T(h, out), the cold fluid inlet temperature T(c, in), the cold fluid outlet temperature T(c, out), the hot fluid flow Flow (h), the control demand of the hot fluid control valve CD(h), the control demand of the cold fluid control valve CD(c), the temperature setpoint of the master cascade control loop SP(t), the setpoint for the hot fluid flow rate control SP(h), the differential pressure across the heat exchanger for hot fluid side DP(h), the valve position for hot fluid control valve VP(h), the valve position for cold fluid control valve VP(c) and the setpoint for the cold fluid flow rate SP(c). Additionally, the calculated overall heat exchanger thermal resistance value 1/UA is indicated. The table illustrates a first set of conditions 144 indicative of hot fluid flow measurement drift and a second set of conditions 146 indicative of heat exchanger fouling. The sets of conditions reflect changes in particular monitored parameters, for example, whether the parameter is "up" or "down" relative to a learned baseline mean $\mu$ and/or standard deviation $\sigma$. That is, during an initial learning process, baseline parameters are established such as but not limited to mean and standard deviation. The monitored parameters may be compared on an up or down basis relative to those baseline parameters or multiples thereof, e.g., the parameter may be considered up or down if the monitored value exceeds 3 standard deviations away from the baseline value in either a positive or negative direction.

In the illustrated example, all things being the same, the available process data provides insufficient evidence to determine whether the fault is heat exchanger fouling 146 or hot fluid flow measurement drift 144. However, having available an additional calculated value. i.e., the heat exchanger overall thermal resistance 1/UA, allows identification of heat exchanger fouling 146.

Statistical process monitoring can be used to determine a baseline for overall thermal resistance indicative of heat exchanger fouling using the data available from the increase, the rate of increase and the value of overall heat exchanger thermal resistance in conjunction with other process data. These additional process data may include the cold fluid outlet temperature T(c, out), the hot fluid flow Flow (h), the control demand of the hot fluid flow controller CD(h), the control demand of the cold fluid flow controller CD(c), the differential pressure across the heat exchanger for hot fluid side DP(h), the valve position for hot fluid control valve VP(h), the valve position for cold fluid control valve VP(c) and the setpoint for the cold fluid flow rate SP(c) as indicated in the FIG. 6 table.

Additionally, diagnostics using statistical process monitoring may be advantageously performed for the heat exchanger 100. In particular, various diagnostic methodologies can be used to determine the health of a heat exchanger. The statistical processing methodologies can be implemented either in field devices, such as in the various Rosemount transmitter devices, or at the host system as software. An advantage of these methods is an ability to use statistical process parameters evaluated by field instruments that provide high quality measurements and fast estimates.

There are a number of possible platforms to implement these statistical methods and detection. In particular, these conditions may be detected as part of a transmitter advanced diagnostics block disposed within a valve or a transmitter associated with the heat exchanger 100, a temperature sensor/transmitter, a level sensor/transmitter, a pressure sensor/transmitter, etc. In particular, a diagnostic block may be trained to detect or determine a baseline thermal resistance, when the system is healthy, and then may monitor the mean value of the thermal resistance and any other appropriate parameters after establishing the baseline. On the other hand, monitoring and detection could be achieved using an SPM block in a transmitter or other field device with a simple threshold logic. That is, the SPM block could monitor the thermal resistance to determine the mean, the standard deviation. etc. for and compare these statistical measures to a pre-established threshold (which may be set by a user or which may be based on a baseline statistical measure computed from measurements of the appropriate process variables during a training period). Also, if desired, host level software run in a user interface device or other computing device connected to the field devices, such as an advanced diagnostic block explorer or expert, maybe used to set and monitor normal and abnormal values and to perform abnormal situation detection based on the concepts described above.

Figure 7:
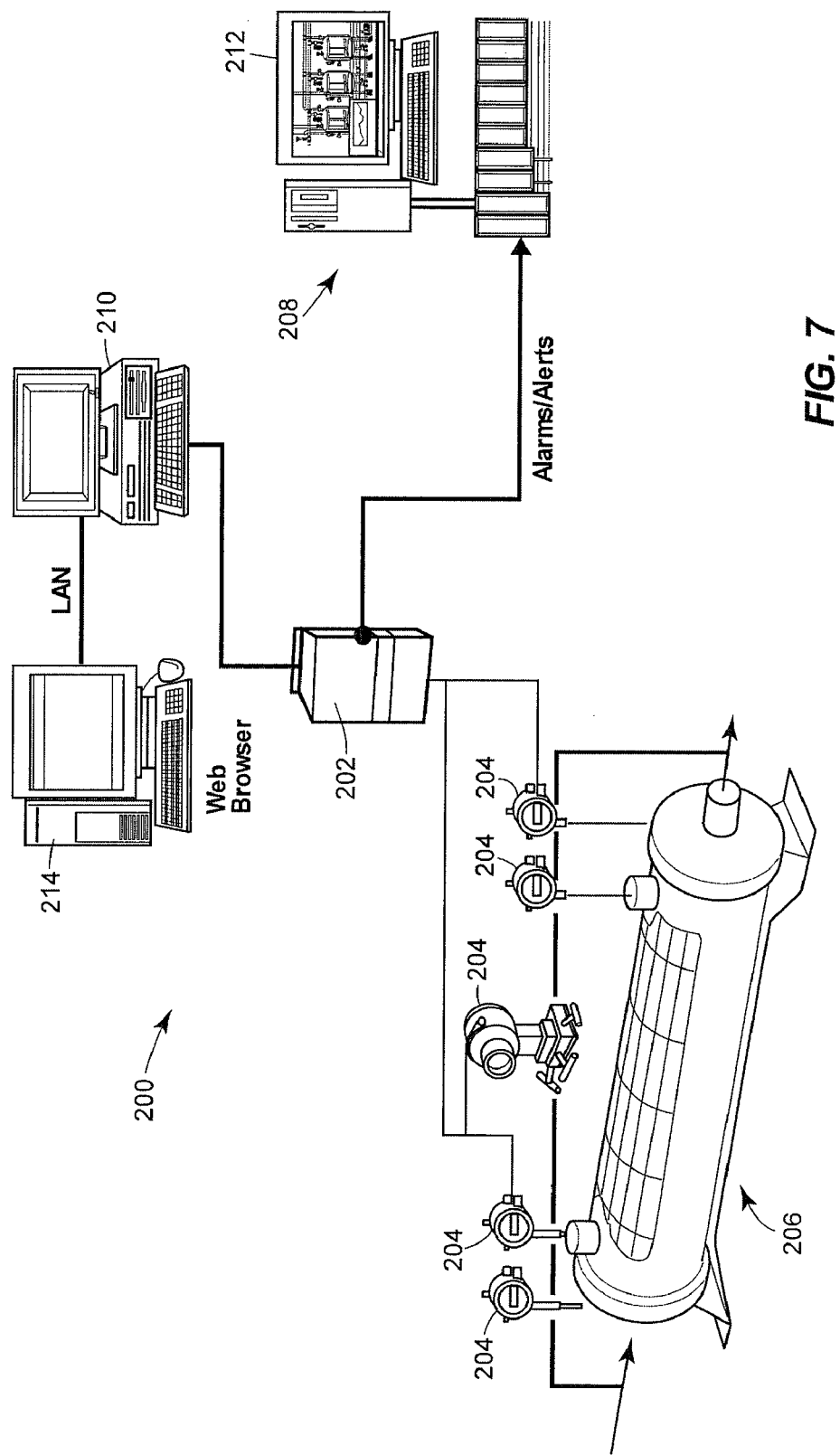
FIG. 7 is a depiction of an interface device connected a process plant.

FIG. 7 illustrates a process plant system 200 and an interface device 202 connected between a set of field devices 204 (forming part of a heat exchanger 206) and a process controller system 208 that may implement heat exchanger fouling detection in accordance with one or more of the herein described embodiments. Here, the interface device 202 may provide data for viewing to a host 210, and may provide alerts or alarms to the controller system 208. The controller system 208 may integrate these alerts or alarms with other controller type alerts and alarms for viewing by, for example, a control operator at an operator workstation 212. Of course, if desired, the host workstation 212 may include any desired viewing application to view the data collected in and provided by the interface device 202 in virtually any desired manner. Likewise, this data may be made available for viewing by other users via a web browser 214. Thus, as will be understood, the various applications discussed herein as being associated with the abnormal situation prevention system, the SPM blocks (if used), and other systems may be distributed in different devices. For instance, data (such as SPM data) may be collected in one device, such as a field device 204, and sent to another device, such as in the interface device 202, that implements the heat exchanger fouling detection system. Alerts, alarms, or other indicators may be sent to yet another device, such as the workstation 212, for presentation to a user. Likewise, configuration information may be input via a user interface device, such as a host, a web browser, a PDA, etc. and sent to a different device, such as the interface device 202.

Some or all of the blocks, such as the SPM or ADB blocks illustrated and described herein may be implemented in whole or in part using software, firmware, or hardware. Similarly, the example methods described herein may be implemented in whole or in part using software, firmware, or hardware. If implemented, at least in part, Using a software program, the program may be configured for execution by a processor and may be embodied in software instructions stored on a tangible medium such as CD-ROM, a floppy disk, a hard drive, a digital versatile disk (DVD), or a memory associated with the processor. However, persons of ordinary skill in the art will readily appreciate that the entire program or parts thereof could alternatively be executed by a device other than a processor, and/or embodied in firmware and/or dedicated hardware in a well known manner.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary the intention is to cover all modifications, alternative constructions and equivalents falling within the spirit and scope of the disclosure as defined by the appended claims.

What is claimed is:

1. A method of detecting an abnormal situation associated with a heat exchanger, comprising:
receiving measured data pertaining to a process parameter sensed by at least one sensor device associated with the heat exchanger;
determining a baseline value of an operating characteristic of the heat exchanger from the measured data, wherein the baseline value corresponds to healthy operation of the heat exchanger;
determining one or more statistical measures associated with the operating characteristic; and
using the baseline value of the operating characteristic and the one or more statistical measures associated with the operating characteristic to detect the abnormal situation within the heat exchanger;
wherein the operating characteristic is a thermal resistance 1/UA of the heat exchanger,
wherein U is an average heat transfer coefficient per unit surface area and A is a surface are of the heat transfer.

2. The method of claim 1, wherein the abnormal situation comprises heat exchanger fouling.

3. The method of claim 1, wherein the process parameter relates to at least one of a first fluid inlet temperature, a first fluid outlet temperature, a first fluid flow rate, a second fluid inlet temperature, a second fluid outlet temperature or a second fluid flow rate.

4. The method of claim 1, wherein the process parameter is one of a group of process parameters consisting of: a control demand of a first fluid control valve CD(h), a control demand of a second fluid control valve CD(c), a temperature setpoint of a master cascade control loop SP(t), a setpoint for the first fluid flow rate control SP(h), a differential pressure across the heat exchanger for first fluid side DP(h), a valve position for first fluid control valve VP(h), a valve position for second fluid control valve VP(c) and a setpoint for a second fluid flow rate SP(c).

5. The method of claim 1, further including processing the measured data to produce processed data and wherein determining the one or more statistical measures associated with the operating characteristic includes determining the one or more statistical measures using the processed data.

6. The method of claim 1, wherein using the baseline value of the operating characteristic and the one or more statistical measures associated with the operating characteristic to detect the abnormal situation within the heat exchanger includes comparing the baseline value of the operating characteristic to the one or more statistical measures associated with the operating characteristic to detect the abnormal situation.

7. The method of claim 6, wherein comparing the baseline value of the operating characteristic to the one or more statistical measures associated with the operating characteristic to detect the abnormal situation within the heat exchanger comprises evaluating a relative deviation of each of the one or more statistical measures associated with the operating characteristic from the baseline value of the operating characteristic.

8. The method of claim 1, wherein using the baseline value of the operating characteristic and the one or more statistical measures associated with the operating characteristic to detect the abnormal situation within the heat exchanger comprises detecting a rate of change of the operating characteristic.

9. The method of claim 1, wherein determining the one or more statistical measures associated with the operating characteristic comprises providing a statistical process monitoring (SPM) block associated with a process device, the SPM block being configured to monitor the operating characteristic and to provide the one or more statistical measures.

10. A method of detecting an abnormal situation in a heat exchanger, comprising:
providing a plurality of statistical process monitoring (SPM) blocks associated with the heat exchanger, each SPM block receiving measurements of a process parameter associated with the heat exchanger and determining a statistical measure of the process parameter from the process parameter measurements to provide a plurality of statistical measures;
providing a baseline value for each of the statistical measures;
determining a difference between each statistical measure and its associated baseline value; and
detecting the existence of the abnormal situation within the heat exchanger based on the differences between the statistical measures of the process parameter and the respective baseline values;
wherein the process parameter is one of a group of process parameters consisting of: a control demand of a first fluid control valve CD(h), a control demand of a second fluid control valve CD(c), a temperature setpoint of a master cascade control loop SP(t), a setpoint for the first fluid flow rate control SP(h), a differential pressure across the heat exchanger for first fluid side DP(h), a valve position for first fluid control valve VP(h), a valve position for second fluid control valve VP(c) and a setpoint for a second fluid flow rate SP(c).

11. The method of claim 10, further comprising providing a root cause diagnostic (RCD) table and organizing the statistical measures within the RCD table.

12. The method of claim 10, wherein the abnormal situation comprises heat exchanger fouling.

13. The method of claim 10, wherein the process parameter relates to an overall thermal resistance 1/UA of the heat exchanger, wherein U is an average heat transfer coefficient per unit surface area and A is a surface area of heat transfer.

14. The method of claim 10, wherein detecting the existence of the abnormal situation within the heat exchanger is further based on at least one of a first fluid inlet temperature, a first fluid outlet temperature, a first fluid flow rate, a second fluid inlet temperature, a second fluid outlet temperature or a second fluid flow rate.

15. The method of claim 10, wherein the baseline values comprise at least one of a learned mean value, a learned standard deviation value, a multiple of a learned mean value, a multiple of a learned standard deviation value, or a linear combination of a learned mean value and a learned standard deviation value.

16. A method of detecting an abnormal situation associated with a heat exchanger, comprising:
receiving measured data using a statistical process monitoring (SPM) block associated with a process device, the measured data pertaining to a process parameter sensed by at least one sensor device associated with the heat exchanger;
determining, within the SPM block, one or more statistical measures associated with the process parameter using the measured data; and
using the one or more statistical measures associated with the process parameter to detect the abnormal situation within the heat exchanger;
wherein the process parameter is one of a group of process parameters consisting of: a control demand of a first fluid control valve CD(h), a control demand of a second fluid control valve CD(c), a temperature setpoint of a master cascade control loop SP(t), a setpoint for the first fluid flow rate control SP(h), a differential pressure across the heat exchanger for first fluid side DP(h), a valve position for first fluid control valve VP(h), a valve position for second fluid control valve VP(c) and a setpoint for a second fluid flow rate SP(c).

17. The method of claim 16, further comprising organizing the measured data in accordance with a root cause diagnostic fault table, and wherein using the one or more statistical measures associated with the process parameter to detect the abnormal situation within the heat exchanger comprises evaluating a relative deviation of each of the one or more statistical measures associated with the process parameter from a baseline value.

18. The method of claim 17, wherein the baseline value is determined as a statistical measure of a first set of the measured data, and wherein the one or more statistical measures associated with the process parameter are determined from a second set of the measured data.

19. The method of claim 16, wherein using the one or more statistical measures associated with the process parameter to detect the abnormal situation within the heat exchanger comprises evaluating the process parameter relative to a setpoint value.

20. A method of detecting an abnormal situation associated with a heat exchanger, comprising:
receiving measured data pertaining to a process parameter sensed by at least one sensor device associated with the heat exchanger;
determining a baseline value of a first statistical measure of the process parameter;
determining a further statistical measure of the process parameter from the measured data; and
detecting the abnormal situation within the heat exchanger by comparing the baseline value of the first statistical measure of the process parameter to the further statistical measure of the process parameter;
wherein the process parameter is one of a group of process parameters consisting of: a control demand of a first fluid control valve CD(h), a control demand of a second fluid control valve CD(c), a temperature setpoint of a master cascade control loop SP(t), a setpoint for the first fluid flow rate control SP(h), a differential pressure across the heat exchanger for first fluid side DP(h), a valve position for first fluid control valve VP(h), a valve position for second fluid control valve VP(c) and a setpoint for a second fluid flow rate SP(c).

21. The method of claim 20, wherein determining the baseline value of the first statistical measure of the process parameter includes determining the baseline value as a statistical measure of a first set of the measured data, and wherein determining the further statistical measure of the process parameter from the measured data includes determining the further statistical measure of the process parameter from a second set of the measured data.

22. The method of claim 20, wherein determining the baseline value of the first statistical measure of the process parameter includes using a predetermined value of the process parameter as the baseline value of the first statistical measure of the process parameter.

23. The method of claim 16, wherein the process parameter relates to an overall thermal resistance 1/UA of the heat exchanger, wherein U is an average heat transfer coefficient per unit surface area and A is a surface area of heat transfer.

24. The method of claim 20, wherein the process parameter relates to an overall thermal resistance 1/UA of the heat exchanger, wherein U is an average heat transfer coefficient per unit surface area and A is a surface area of heat transfer.

* * * * *

UNITED STATES PATENT AND TRADEMARK OFFICE
CERTIFICATE OF CORRECTION

| | | |
|---|---|---|
| PATENT NO. | : 7,827,006 B2 | Page 1 of 1 |
| APPLICATION NO. | : 11/669696 | |
| DATED | : November 2, 2010 | |
| INVENTOR(S) | : John P. Miller | |

It is certified that error appears in the above-identified patent and that said Letters Patent is hereby corrected as shown below:

In the Specification:

At Column 2, line 44, "nave" should be -- have --.

At Column 6, line 56, "it" should be -- if --.

At Column 13, line 6, "see" should be -- seen --.

At Column 13, line 16, "define" should be -- defines --.

At Column 16, line 49, "Using" should be -- using --.

Signed and Sealed this
Twenty-sixth Day of April, 2011

David J. Kappos
*Director of the United States Patent and Trademark Office*